April 9, 1957 A. E. HYLAS ET AL 2,788,495

COUPLING CIRCUIT

Filed July 9, 1953 2 Sheets-Sheet 1

INVENTORS
WALTER V. TYMINSKI
ALBERT E. HYLAS
BY
Darby + Darby
ATTORNEYS

INVENTORS.
WALTER V. TYMINSKI
ALBERT E. HYLAS
BY Darby & Darby
ATTORNEYS

United States Patent Office
2,788,495
Patented Apr. 9, 1957

2,788,495

COUPLING CIRCUIT

Albert E. Hylas, Clifton, and Walter V. Tyminski, Nutley, N. J., assignors to Allen B. Du Mont Laboratories, Inc., Clifton, N. J., a corporation of Delaware Application July 9, 1953, Serial No. 367,038

1 Claim. (Cl. 333—25)

This invention relates to circuits for coupling a plurality of electrical loads such as television receivers to a single signal source such as an antenna and to a transformer useful in such coupling.

When a coupling circuit connects more than one receiver to a signal source such as an antenna, it is necessary to provide some isolation means in the coupling circuit to transfer energy only from the source to each receiver and to prevent the transfer of spurious signal energy from each receiver to the others. It is also necessary to match the input impedance of the receivers to the coupling circuit in order to obtain the best isolation and the greatest amount of energy transfer.

One object of the invention is to provide an improved load coupling circuit.

Other objects are to provide an improved input transformer for television receivers and to provide improved circuits for coupling a single signal source or antenna to a plurality of television receivers.

Other objects will be apparent from the following specification together with the drawings in which.

The present invention provides a circuit for coupling a plurality of receivers to a single antenna, or other source, with proper impedance matching and with good isolation between receivers. The isolation is obtained without resorting to isolation resistances which result in a loss of desired signal energy. In its broadest embodiment the invention comprises a circuit coupling a signal source or antenna having a known characteristic impedance to a number of loads or receivers having known input impedances.

The coupling circuit between the antenna and the receivers comprises a plurality of transformers, one for each receiver. The primary windings of all transformers are connected together in series across the output terminals of the antenna and the input impedance of each receiver is connected across the secondary winding of one of the transformers. By providing transformers having an impedance transformation ratio R according to the equation:

$$R=\frac{NK}{Z}$$

where

N is the number of transformers,

K is the terminating impedance of each transformer, and

Z is the characteristic impedance of the antenna, a proper matched impedance condition will be obtained.

In particular, it has been found desirable to use transformers similar to the transformer described by Fred W. Schmidt in co-pending application Ser. No. 257,306, now Patent No. 2,709,219, issued May 24, 1955. These transformers have an impedance transformation ratio of 1:4 from primary to secondary, and by connecting the primary windings of four such transformers in series across the terminals of an antenna having a characteristic impedance of 300 ohms, a television receiver having an input impedance of 300 ohms may be connected across the secondary winding of each of the four transformers. Furthermore, the isolation between receivers is improved by the electrically balanced structure of such transformers.

It has been found that the electrical balance of transformers of the Schmidt type is materially improved by winding the transformer windings in a single layer with the central one of three windings equally spaced from the adjacent windings on either side thereof. Furthermore, the impedance transformation ratio of transformers constructed according to the teachings of Schmidt may be made more constant over the entire television frequency band by adding another winding on the transformer coil form but not connecting that extra winding to any of the other parts of the circuit.

Figure 1:
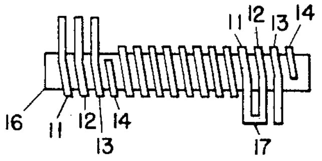
Fig. 1 shows an improved television input transformer constructed according to the present invention.

The transformer 10 of Fig. 1 consists of four interlapping substantially identical windings 11—14 wound in a single layer on a form 16 which may, if desired, include ferro-magnetic material. One end of the windings 11 and 12 is connected together by a shorting strap 17.

Figure 2:
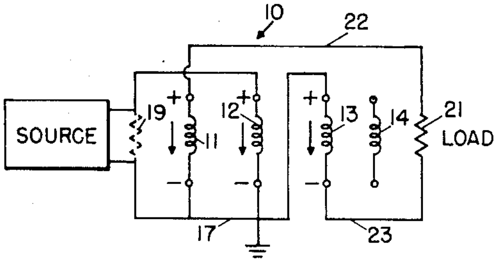
Fig. 2 is a schematic drawing of a circuit incorporating the transformer of Fig. 1.

Fig. 2 shows the transformer 10 connected between a source 18, having an output impedance indicated by a phantom resistance 19, and a load 21.

One winding 12 is connected across the output impedance 19 to be used as the primary winding of transformer 10 in this circuit. Two other adjacent windings 11 and 13 on either side of winding 12 are connected in series across a load impedance 21 to form the secondary winding. The upper end (electrically) of winding 13 is connected to the shorting strap 17 so that the current induced in windings 11 and 13 is additive, and the secondary is therefore a push-pull winding. The balance between windings 11 and 13 is enhanced by their equal spacing from winding 12, as indicated in Fig. 1.

The additive relationship of currents in windings 11 and 13 works equally well when electrical energy is transferred from the push-pull secondary windings 11 and 13 to the primary winding 12. Such a reverse transfer of energy occurs when a signal generated in or near the load 21 (as may happen if the load 21 is located in a receiver) is impressed on the windings 11 and 13. If such a signal is impressed in the same phase on leads 22 and 23, the currents in secondary windings 11 and 13 will be subtractive and will induce substantially equal but opposite signals in primary winding 12. The net result is that such a signal will not be transferred to the primary winding 12 and therefore cannot affect the signal from source 18. Only those signals impressed in opposite polarity on leads 22 and 23 can be transferred to the primary winding 12.

Figure 3:
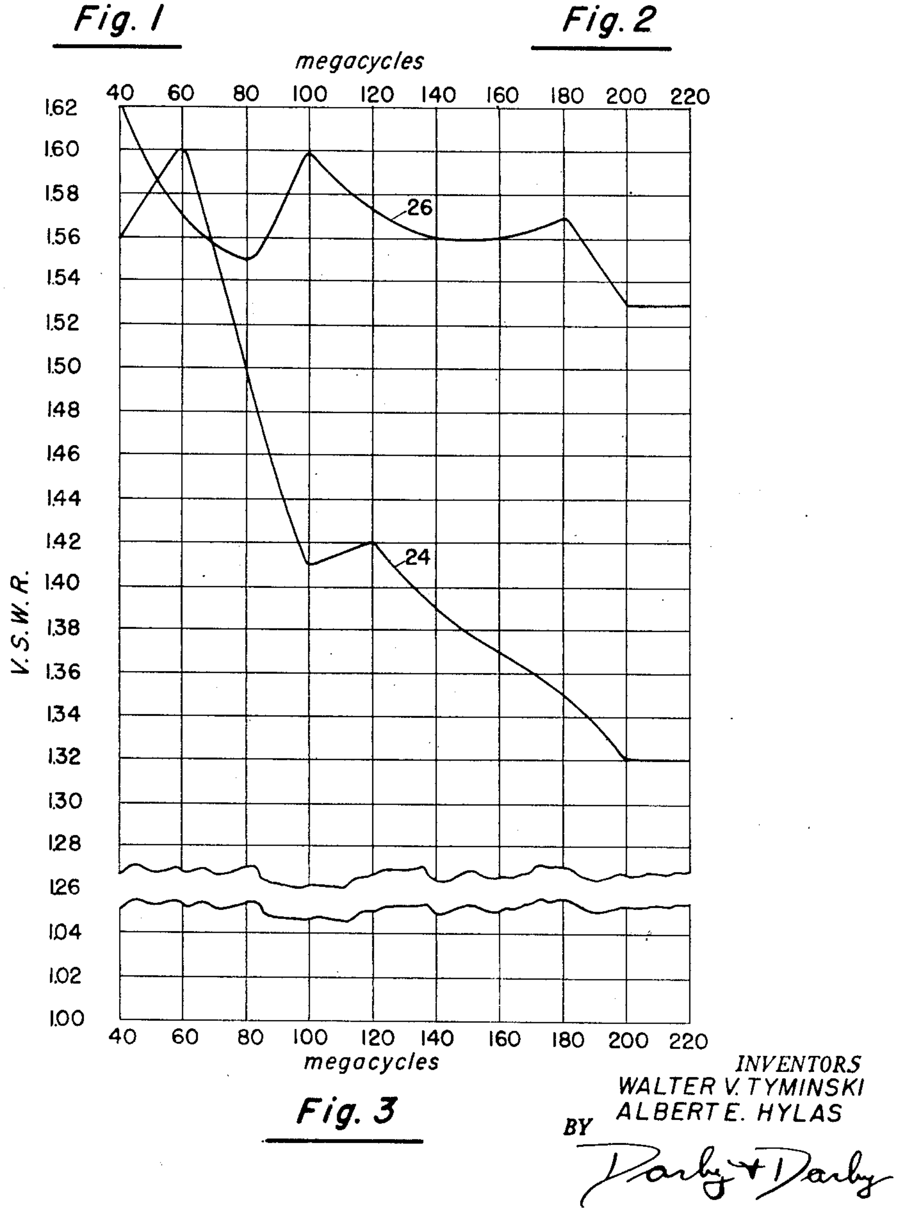
Fig. 3 is a graph illustrating the improvement of the transformer of Fig. 1 over the prior art.

Fig. 3 is a graph indicating a comparison between the quality of the Schmidt transformer having three windings only, corresponding to windings 11—13 of Figs. 1 and 2, and the quality of our improved transformer having the additional unconnected winding 14 (Fig. 2). It is difficult to theorize on the cause of improvement over the Schmidt transformer. Suffice it to say that the voltage-standing-wave-ratio (V. S. W. R.) curve 24 of the improved transformer 10 of Figs. 1 and 2 is significantly closer to the ideal value of 1.00 throughout most of the television band of frequencies than even the excellent V. S. W. R. curve 26 of the Schmidt three-winding transformer. Since the V. S. W. R. is an indirect measure of the impedance matching characteristics of the transformer, it is desirable to use the improved four-winding transformer in any circuit where impedance matching and the concomitant circuit isolation are important.

Figures 4, 5, 6, 7:
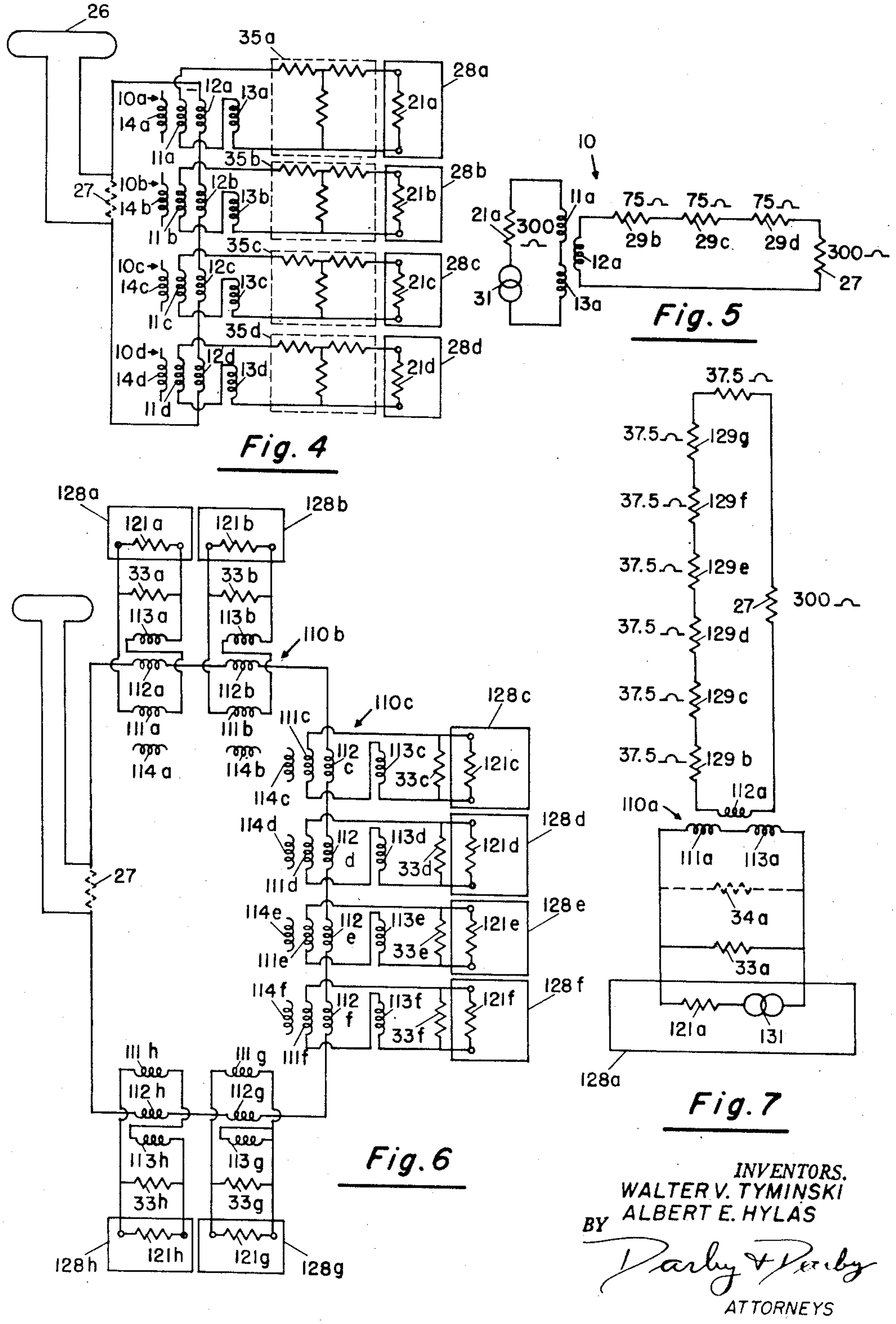
Fig. 4 shows a television coupling circuit for connecting four television receivers to a single antenna in accordance with the invention.
Fig. 5 shows the equivalent circuit of Fig. 4.
Fig. 6 shows a circuit for connecting eight television receivers to a single antenna.
Fig. 7 shows the equivalent circuit of Fig. 6.

Fig. 4 shows a coupling circuit for connecting four receivers to an antenna and embodies the features of the invention. The number of receivers connected to the antenna is not to be considered as a limitation on the invention but has been chosen as being particularly suited to the characteristics of conventional receivers and antennas, as will be made more apparent hereinafter.

The antenna 26 in Fig. 4 is a conventional folded dipole having a characteristic impedance of 300 ohms, as indicated by the phantom resistor 27. The output terminals of the antenna 26 are connected across the series connected primary windings 11*a–d* of the four transformers 10*a–d*.

Since the transformers are identical, they will be distinguished where necessary by suffixes *a–d* and the same suffix notation will be applied to the loads connected to the individual transformers.

In the present embodiment the loads 21 connected to the secondary winding of the transformer 10 are conventionally represented as resistors. In reality, the loads 21 are the input impedances of television sets 28. The windings 14 of the transformers 10 are shown, as in Fig. 2, unconnected to any other part of the circuit. It is not essential that transformers employing a fourth winding be used, although as described hereinabove, there are advantages to be gained thereby.

In the operation of the circuit of Fig. 4 the signal arriving at the antenna 26 is split equally between the four input windings 12*a*—12*d* of transformers 10*a*—10*d*. In order that all of the power from the antenna 26 may be dissipated in the loads 21*a*—21*d*, the impedance transformation ratio of transformers 10*a*—10*d* must be such that the total load represented by the four transformers in series equals the characteristic impedance 27 of the antenna 26. The secondary windings 11 and 13 of each of the transformers 10 have exactly the same number of turns as the primary winding 12 and, since the windings 11 and 13 are connected in series, a secondary with twice the number of turns of the primary 12 is formed so that the impedance transformation ratio of each of the transformers 10 is 4:1. The equivalent impedance presented by the primary winding 12 is ¼ of the impedance connected across the secondary windings 11 and 13. Since the input impedance 21 connected across the secondary windings 11 and 13 is commonly 300 ohms for present day television receivers, the impedance across each of the primary windings is 75 ohms, i. e. ¼ of the 300 ohm impedance 21. Therefore, four of these primary windings, each presenting 75 ohms impedance connected in series, properly terminate the 300 ohm characteristic impedance of the antenna 26, and all of the power will be transferred equally to the impedances 21*a*—21*d*, with none being returned to the antenna 26.

In Fig. 5 certain parts of the circuit of Fig. 4 have been replaced by their equivalent impedances. For instance, the antenna 26 has been replaced by its equivalent impedance 27 connected in series with three resistors 29*b*—29*d*, which represent, respectively, the equivalent impedances presented at the primary windings 12*b*—12*d* in Fig. 4. The transformer 10*a* has been shown in conventional form with the push-pull secondary windings 11*a* and 13*a* connected to a source of voltage 31 in series with a characteristic impedance 21*a*. The signal source 31 in Fig. 5 may be a source of local oscillations or any source of extraneous signals within the set 28*a*. As has been described in connection with Fig. 2, it is possible for only certain signals generated in the set 28*a* to be transformed by the transformer 10*a* so as to be applied to the series connected primary winding 12*a*. However, source 31 in Fig. 5 represents a source connected to the secondary windings 11*a* and 13*a* in push-pull to transfer a maximum amount of energy to the primary winding 12*a*.

The signal so transferred to winding 12*a* is then applied to a voltage divider comprising the impedances 29*b*—29*d* and the antenna impedance 27. As is well-known, most of this extraneous signal will be dissipated by the antenna impedance 27 since it is 300 ohms, while the impedances 29*b*—29*d* are only 75 ohms each. The extraneous signal from source 31 dissipated in any one of the impedances 29*b*—29*d* will be in the relation of 75 to 525 (total impedance) which is a power loss of 8.46 db between the total extraneous signal at the terminals of winding 12*a* and the signal at any one of the windings 12*b*—12*d*. Since the desired signal from antenna 26 is split equally between the four windings 12*a*—12*d*, there will be an effective loss of 6 db between the power at the antenna 26 and the power dissipated by any one of the input impedances 21*a*—21*d*.

It is convenient to speak of the difference between the power transferred from receiver to receiver and the power transferred from antenna to receiver as being a directivity of the system. The directivity in this case will be 2.46 db which is the difference between 8.46 db and 6 db. This 2.46 db in most cases is satisfactory isolation between one of the receivers and another of the receivers, but if it is desired to improve the directivity, it may be done by inserting a lossy attenuator such as a resistive attenuator pad 35 in series between the input impedance 21 of each receiver and the corresponding secondary winding 11 and 13 as shown in Fig. 4. The desired signal will then be further attenuated by the amount of the loss induced but the undesired signal transferred from receiver to receiver must be passed through two of these attenuators and will, therefore, be reduced twice as much.

Fig. 6 illustrates an embodiment in which the directivity of the system is improved over the embodiment in Fig. 4 and the number of receivers may be coupled to a single source or antenna is doubled. However, these advantages are achieved at the expense of a reduction in the power of the desired signal applied to each set. Consequently, the embodiment of Fig. 6 may be limited to locations in which the strength of the signal supplied by the antenna or source is somewhat greater than the signal strength required by the embodiment of Fig. 4.

In Fig. 6 the same antenna 26, having a 300 ohm output impedance 27, is coupled in series with the primary windings 112*a*—112*h*. As in embodiments previously described, the secondary winding of each of the transformers 110 consists of a pair of windings 111 and 113 connected in series with an input impedance 121 of a corresponding receiving set 128 connected thereacross.

It is necessary to match the total impedance presented by the series connection of the primary windings 112*a*—112*h* of the eight transformers 110*a*—110*h* to the characteristic impedance 27 of the antenna 26. Since there are now eight transformers 110, the impedance of each primary must be limited to 37.5 ohms and since the impedance transformation ratio of each transformer remains 4:1 as before, it is apparent that the impedance connected across the secondary windings of each of the transformers 110 must be 150 ohms instead of 300 ohms. The 150 ohms may be obtained by design of the receivers 128 or, if it is desired to use conventional receivers in which the input impedance 121 in 300 ohms, a parallel 300 ohm resistor 33 must be connected thereacross.

As a result, each of the transformers will abstract ⅛ of the signal provided by the antenna 26 instead of ¼ as in Fig. 4 and this ⅛ will be further divided between the impedance 33 and the impedance 121. Thus, the operating signal for each receiver will the $\frac{1}{16}$ of the signal applied to the antenna 26, which is a loss from antenna to receiver of 12 db.

In order to determine the loss incurred in transmitting an extraneous or undesired signal from one receiver to another, the circuit of Fig. 6 is reduced to its equivalent circuit in Fig 7. Here, as in Fig. 5, the impedances presented by the primary windings **112*b*—112*h* are represented by resistors 129*b*—129*h*. In the embodiment of Fig. 6, the impedance presented by each primary winding 112 is only 37.5 ohms. The sum of resistances 129*b*—129*h* and the antenna resistance 37 is 562.5 ohms. This is transformed in the ratio of 4:1 to the push-pull winding 11*a* and 113*a* of transformer 110*a* and is effectively a resistance 34 of 2128 ohms, which is connected in parallel with the 300 ohm resistor 33*a*. The power generated by source 131 will divide between resistors 33*a* and 34 in the ratio 300:2128, or approximately 1:7. Therefore, only $\frac{1}{7}$ of the power generated by source 131 in receiving set 128*a* will circulate in the loop comprising winding 112*a*, antenna resistance 27, and equivalent impedances 129*b*—129*h*. Of the power circulating in the loop, only $\frac{37.5}{562.5}$, or $\frac{1}{15}$, may be taken by any one of the resistors 129*b*—129*h*. That means that $\frac{1}{7}\times\frac{1}{15}$, or $\frac{1}{105}$, of the undesired signal power generated in the receiving set 128*a* will be applied to any of the primary windings 112*b*—112*h*, and, as has been mentioned before, only half of the power applied to a primary winding 112 is available to the corresponding input impedance 121**. Therefore, the fraction $\frac{1}{105}$, must be multiplied by $\frac{1}{2}$ to obtain the fraction of the effective power transferred from one receiver to another. This represents a loss of approximately 24 db, which compares with an antenna to receiver loss of 12 db, to give a directivity of 12 db. This is almost 10 db greater than the directivity of the four set system of Fig 4.

It will be noticed that the impedance transformation ratio, the number of receiving sets, the input impedance of the receivers, and the output impedance of the source are related. If the transformation ratio R and the source output impedance Z be held constant, as the number N of receivers increases, the terminating impedance K on the secondary of each transformer must decrease. Thus, in doubling the number of receivers from four in Fig. 4 to eight in Fig. 6, it was necessary to cut the terminating impedance in half. However, if the source imepdance 27 had also been doubled along with the number of receivers, the terminating impedance could have remained constant.

These four factors may be combined as $$R=\frac{NK}{Z}$$

where K is the terminating impedance of each transformer and may be made up of the input impedance of a receiver alone or the input impedance combined with an additional impedance, such as impedance 33 in Fig. 6. This equation also assumes equality of input impedance between all receivers and equality of impedance transformation ratio between all transformers, but it will be obvious to those skilled in the art that the advantages may be utilized also in systems where such equality does not exist.

It should be noted in the embodiment of Fig. 4 that if the input impedance 21 of one of the receivers 28 is shorted only a moderate mismatch of the impedance 27 will result, but if one input impedance 21 is open-circuited, the inductance of the primary of the corresponding transformer will be in series with the primaries of the other three transformers and a deleterious mismatch may well occur.

The same does not hold true for the embodiment of Fig. 6 because each of the transformers 110 is always at least partially terminated by its corresponding resistor 33, and it makes comparatively little difference, so far as impedance matching is concerned whether one of the receivers 128 is connected properly or disconnected. In fact, if four of the receivers 128 are disconnected, the resultant standing wave ratio in the series primary circuit is only of the order of 2.0, not an intolerable figure in most cases.

Although this invention has been described in terms of specific embodiments, it will be obvious to those skilled in the art that modifications may be made therein within the scope of the following claim.

What is claimed is:

A transformer for coupling a balanced line to an unbalanced line comprising: four substantially identical windings interleaved in order in a single layer, each of said windings having the same number of turns and being wound in the same direction; a connection between the remote ends of said first and said second windings and the near end of said third winding; a first terminal connected to the near end of said first winding; a second terminal connected to the remote end of said third winding, said first and second terminals serving as connections for a balanced line; a third terminal connected to the near end of said second winding, a fourth terminal connected to said connection, said third and fourth terminals serving as connections for an unbalanced line; said fourth winding having no terminals connected thereto.

References Cited in the file of this patent

UNITED STATES PATENTS

| | | |
|---|---|---|
| 1,591,660 | Cory | July 6, 1926 |
| 1,753,308 | Cohen | Apr. 8, 1930 |
| 2,013,140 | Friis | Sept. 3, 1935 |
| 2,237,796 | Smith | Apr. 8, 1941 |
| 2,333,148 | Botsford | Nov. 2, 1943 |
| 2,358,520 | Landon | Sept. 19, 1944 |
| 2,709,219 | Schmidt | May 24, 1955 |